United States Patent Office 2,719,846
Patented Oct. 4, 1955

2,719,846

4[N-(β-DIETHYLAMINOETHYL)ANILINO]-PYRIMIDINE AND ACID ADDITION SALTS THEREOF

Robert R. Burtner, Skokie, Ill., assignor to G. D. Searle & Co., Chicago, Ill., a corporation of Illinois No Drawing. Application May 6, 1954,
Serial No. 428,137

4 Claims. (Cl. 260—256.4)

This invention relates to 4-(N-dialkylaminoalkyl-anilino)-pyrimidines, their acid addition salts, and processes for the manufacture of these pyrimidines and their salts. More particularly, this invention relates to compounds of the formula

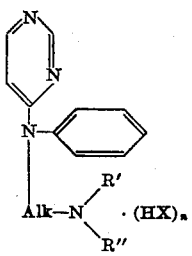

wherein Alk is an alkylene radical containing not more than 4 carbon atoms, R' and R" are lower alkyl radicals containing not more than 5 carbon atoms, X is one equivalent of a non-toxic anion, and n is 0 or an integer not greater than 2.

In the foregoing structural formula, the alkylene radicals comprehended by Alk are bivalent, saturated, acyclic, straight- or branched-chain hydrocarbon radicals of emperical formula $$C_mH_{2m}$$

wherein m is a positive integer less than 5. Among the alkylene radicals represented by Alk are methylene (—CH₂—), 1,2-ethylene (—CH₂CH₂—), 1,1-dimethyl-1,2-ethylene

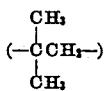

1,2-propylene

2-methyl-1,3-propylene

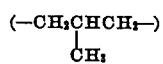

trimethylene (—CH₂CH₂CH₂—), and tetramethylene (—CH₂CH₂CH₂CH₂—) radicals, as well as such other alkylene radicals as fall within the purview of the foregoing definition and terms. The lower alkyl radicals designated by R' and R" in the generic formula above include methyl, ethyl, propyl, isopropyl, butyl, isobutyl, secondary butyl, tertiary butyl, amyl, secondary normal amyl, primary isoamyl, secondary isoamyl, tertiary amyl, and like $C_sH_{2s+1}$ radicals wherein s in a positive integer amounting to less than 6. X in the generic formula refers to an anion such as chloride, bromide, iodide, methyl sulfate, ethyl sulfate, benzenesulfonate, toluenesulfonate, tartrate, succinate, malate, acetate, citrate, nitrate, sulfate, phosphate, and sulfamate which, in combination with the cationic portion of a molecule aforesaid, is neither pharmacologically nor otherwise undesirable in pharmaceutical dosage. When n in the generic formula is 0, the term (HX) drops out, and the compounds represented are basic amines; when n is 1 or 2, the compounds designated are mono- or di-acid addition salts, respectively.

The subject compounds are useful in medicine for the treatment of disease and the relief of conditions inimical to the well-being of the animal body. For example, the compounds of this invention show appreciable chemotherapeutic promise in the field of cardiac pathology. In particular, they are valuable because of their digitalis-like activity, manifesting marked capacity for myocardial stimulation in instances of insufficiency associated with the failing heart.

The amine bases which comprises this invention are relatively insoluble in water but may be dissolved in dilute acids and in most of the common organic solvents. The acid addition salts of this invention are, on the other hand, readily soluble in water and in aqueous solutions of alcohols or other water-miscible organic solvents. The claimed compounds may be administered in solid form as tablets or capsules; dissolved in aqueous media, they may be given parenterally.

The compounds to which this invention relates are prepared by reacting 4-anilinopyrimidine—obtainable by the method of Winkelmann, J. prakt. Chem. 115, 305 (1927)—with a dialkylaminoalkyl halide, desirably the chloride, through the agency of sodamide or the equivalent, in a relatively non-polar inert organic solvent such as toluene. The reaction is carried out at temperatures between 85° and 130° centigrade in an inert atmosphere—for example, nitrogen—over periods of time ranging upward from 8 hours. The basic compounds thus obtained may be converted to the corresponding acid addition salts by simple admixture with 1 or 2 equivalents of any of various inorganic and strong organic acids, the anionic portion of which conforms to X as hereinabove defined.

The following examples will illustrate in detail certain of the compounds which comprise this invention and method which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.), pressures in millimeters (mm.) of mercury, and relative amounts of materials in parts by weight, except as otherwise noted.

*Example 1*

4-[N-(β-diethylaminoethyl) - anilino] - pyrimidine.—
A suspension of 51 parts of 4-anilinopyrimidine and 12 parts of sodamide in 870 parts of dry toluene is heated with agitation at reflux temperatures under an atmosphere of nitrogen until evolution of ammonia ceases. The time required is approximately 4 hours. Heating is then discontinued while 41 parts of β-diethylaminoethyl chloride is added. Refluxing is thereupon resumed and continued for 19 hours, after which the mixture is treated with water to destroy excess sodamide, and the toluene layer separated. Distillation yields a pale yellow oil, B. P. 150–153° C. at 0.3 mm. pressure. This material, 4-[N-(β-diethylaminoethyl)-anilino]-pyrimidine, has the formula:

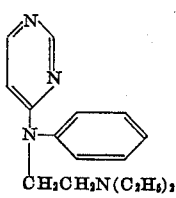

Example 2

*4-[N-(β-diethylaminoethyl)anilino] - pyrimidine dihydrochloride.*—A solution of the base of the foregoing Example 1 in propanol-2 is treated with two equivalents of absolute alcoholic hydrogen chloride and then diluted with ether. The crude acid addition salt which precipitates is filtered out, rinsed with ether, and finally recrystallized from a mixture of propanol-2 and ethyl acetate. Recrystallized again from propanol-2, the desired dihydrochloride is obtained as dense, white crystals, M. P. 232–233° C. (with decomposition). The product, soluble in water has the formula:

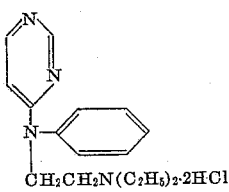

$\dot{C}H_2CH_2N(C_2H_5)_2 \cdot 2HCl$

I claim:

1. A compound selected from the group consisting of 4-[N-(β-diethylaminoethyl)-anilino]-pyrimidine and its acid addition salts.

2. 4-[N-(β-diethylaminoethyl)-anilino]-pyrimidine dihydrochloride.

3. In a process for the manufacture of compounds of the formula:

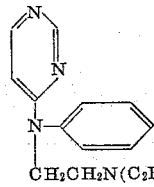

$\dot{C}H_2CH_2N(C_2H_5)_2 \cdot (HX)_n$ wherein X is an anion and $n$ is selected from the group consisting of 0 and positive integers less than 3, the steps which comprise (a) reacting 4-anilinopyrimidine with sodamide in a non-polar organic solvent under an inert atmosphere at temperatures between 85° and 130° centigrade for periods of time necessary to complete the evolution of ammonia gas, and (b) heating the product of this reaction with β-diethylaminoethyl chloride.

4. The process of claim 3 wherein the solvent is toluene and the reaction is carried out in an atmosphere of nitrogen.

No references cited.